US006332514B1

(12) United States Patent
Chen

(10) Patent No.: US 6,332,514 B1
(45) Date of Patent: Dec. 25, 2001

(54) MECHANICAL DISK-TYPE FRICTION BRAKE AND DISK TYPE FRICTION CLUTCH

(76) Inventor: Kun Chen, Neijang Mother & Child Health Care Clinic (Han Bridge), Neijiang City, Sichuan Province 641000 (CN)

( * ) Notice: Subject to any disclaimer, the term of this patent is extended or adjusted under 35 U.S.C. 154(b) by 0 days.

(21) Appl. No.: 09/485,466

(22) PCT Filed: Sep. 11, 1998

(86) PCT No.: PCT/CN98/00187

§ 371 Date: Mar. 22, 2000

§ 102(e) Date: Mar. 22, 2000

(87) PCT Pub. No.: WO99/14515

PCT Pub. Date: Mar. 25, 1999

(30) Foreign Application Priority Data

Sep. 12, 1997 (CN) ................................................ 97115877

(51) Int. Cl.[7] .................................................... F16D 55/31
(52) U.S. Cl. ...................... 188/72.7; 188/71.8; 188/72.9; 188/2 D; 192/70.23; 192/93 A
(58) Field of Search ............................... 188/71.8, 71.7, 188/72.1, 72.7, 72.9, 24.14, 24.15, 2 D; 192/70.23, 93 A

(56) References Cited

U.S. PATENT DOCUMENTS

| 1,053,163 | * | 2/1913 | Dennis | 192/93 R |
|---|---|---|---|---|
| 2,487,936 | * | 11/1949 | McCrady | 192/93 R |
| 2,490,398 | * | 12/1949 | Ashcauer | 192/69 |
| 2,667,253 | * | 1/1954 | Sherman | 192/99 |
| 2,682,942 | * | 7/1954 | Thunstrom et al. | 192/48 |
| 3,371,750 | * | 3/1968 | Schutte et al. | 188/73 |
| 3,547,229 | * | 12/1970 | Pollinger | 188/59 |
| 4,109,765 | * | 8/1978 | Johannesen | 188/72.7 |
| 4,630,720 | * | 12/1986 | Boni | 192/48.8 |
| 5,833,035 | * | 11/1998 | Severinsson | 188/72.7 |
| 5,848,673 | * | 12/1998 | Strauss et al. | 188/1.11 |

OTHER PUBLICATIONS

*Automobile Engineering Handbook*, published in 1984, China.
*Machinery Parts*, published in 1991, China.
*Automobile Design*, published in 1981, China.
*Illustrated Book Clutch Construction*, published in 1985, China.

* cited by examiner

Primary Examiner—Robert J. Obertleitner
Assistant Examiner—Bradley King
(74) Attorney, Agent, or Firm—Oliff & Berridge PLC

(57) ABSTRACT

A mechanically actuated brake or a mechanically actuated clutch comprises a lever block (24) installed between a supporting member (22) and a first driving part (6), a voussoir (21) installed between the supporting member (22) and the lever block (24). Abutting against the supporting member (22), the voussoir (21) is connecting with an operating device and is moved by the operating device which is equipped with a restoring spring (11, 35) for resetting the voussoir (21) while the brake is relieved or the clutch is jointed. There are three force-bearing points (A, B, C) on the lever block (24) which may swing around the second force-bearing point (B) under the coition of the voussoir (21). When the brake is braked or the clutch is joined, the first force-bearing point (A) and the third force-bearing point (C) respectively are situated on the two sides of the straight line which passes through the second force-bearing point (B) and extends along relatively moving orientation of the first driving part (6) and a second driving part (1).

17 Claims, 8 Drawing Sheets

MECHANICAL DISK-TYPE FRICTION BRAKE AND DISK TYPE FRICTION CLUTCH

FIELD OF THE INVENTION

The invention relates to a friction clutch and a friction brake, and particularly to disk-type friction clutch and disk-type friction brake.

BACKGROUND OF THE INVENTION

Clutches and brakes are critical basic components used in mechanical transmission systems. Clutches function to accomplish the transmission or separation of motions or powers between the driving parts and the driven parts in machines, and friction clutches have the advantage of stable engagement in the case that a relatively large rotating speed difference exists between the driving parts and the driven parts. Friction brakes have the advantage of stable braking in the case that a relatively large rotating speed difference exists between driven parts (rotating parts) and driving parts (stationary parts). Therefore, both friction clutches and friction brakes have found wide use in various fields, particularly in automobile and motorcycle fields. Friction brakes, due to that one of main parts is stationary, are simpler than friction clutches in construction, and therefore people often take the friction clutches and the friction brakes as the same kind of components to study, design and manufacture.

One important type of clutches are external-force operated friction clutches, one of which is a mechanical friction clutch which is generally manually operated for engagement or disengagement of the clutch. For example, normally engaged mechanical clutches commonly used in automobiles are maintained engaged by a spring which press the diving part tightly against the driven part to produce normal pressure, thus causing the production of friction forces between them to transmit motion and power; when there is a need for disengagement of the clutch, the spring is compressed by levers or a hydraulic system controlled by the pedal, thus disengaging the clutch. For a manually operated mechanical clutch, since a man's strength and the operating stroke are limited, there are such disadvantages as small torque transmitted, more labor intensity and larger volume.

The friction brakes used in transport machinery such as automobiles, motorcycles and the like generally fall into two categories: drum-type and disk-type. The drum-type is simple in construction, has the self-boosting ability and a low cost, but it has such disadvantages as; when heated, the braking force will be significantly reduced (by about 55%), the phenomenon being called heat fading; and stained with water, the braking force will almost completely lose, the phenomenon being called water fading, thus seriously influencing the braking performance and endangering the driving safety. Although disk brakes do not have such disadvantages as heat fading and water fading, they do not have the self-boosting ability, so it is necessary to increase the operating force by up to a hundred or a thousand times for their use, it is necessary to install a set of complicated high pressure hydraulic system as a motive force booster when used in cars, and they can not be used in big automobiles. Since there is a need for motive force boosting, it has hardly the braking ability when the engine stops operating. Because of the complicated construction and high precision of their boosting system and hydraulic system, they have a high production cost and low reliability. Even intermediate and low grade cars do not use the disk brakes for all their brakes, and generally the front brakes are disk brakes and the rear brakes are drum brakes.

The disk brakes used in motorcycles are not provided with motive force boosting system due to their light bodies, but all employ the high pressure hydraulic system, therefore they have a complicated construction, a high production cost and a lower reliability than that of drum brakes.

SUMMARY OF THE INVENTION

The object of the present invention aims to solve the problems associated with above-mentioned friction brakes and clutches, and to provide a clutch and a brake which is compact and simple in structure, can produce large bearing capacity and large braking force with a small operating force and small operating stroke, and can reduce production cost and operates smoothly.

To achieve above object, there is provided a mechanical disk-type brake, the brake comprises a control mechanism for controlling the operation of the brake; a first driving member and a second driving member, the first and second members being able to move relative to each other; a driven member disposed between the first and second driving members and being able to engage frictionally with the driving members; and a supporting member connected with the second driving member, the supporting member being on the side of the first driving member opposite to the driven member, wherein the brake further comprising a lever block disposed between the supporting member and the first driving member, and a voussoir disposed between the supporting member and the lever block; the lever block having three force-bearing portions, the first force-bearing portion abutting against the supporting member, the second force-bearing portion abutting against the first driving member, and the third force-bearing portion abutting against the voussoir when applying the brake, the second force-bearing portion being located between the first force-bearing portion and the third force-bearing portion; the voussoir abutting against the supporting member and being connected to the control mechanism, and being movable under the action of the control mechanism in the direction substantially perpendicular to the direction of the relative movement of the first and second driving members; the control mechanism being provided with a return spring for biasing the voussoir to its initial position when releasing the brake; the lever block being able to turn about the second force-bearing point as a lever fulcrum under the action of the voussoir to apply the brake or release the brake, wherein when applying the brake, the application point of the force at the first force-bearing portion and that at the third force-bearing portion of the lever block being situated respectively on the opposite sides of the straight line which passes through the application point of the force at the second force-bearing portion of the lever block and extends along a direction parallel to the direction of the relative movement between the first driving member and the second driving member.

According to one aspect of the invention, there is provided a mechanical disk-type friction clutch, comprising a control mechanism for controlling the operation of the clutch; a first driving member and a second driving member, the first and second members are able to move relative to each other; a driven member disposed between the first and second driving members and being able to engage frictionally with the driving members; and a supporting member connected with the second driving member, the supporting member being on the side of the first driving member opposite to the driven member, wherein the clutch further comprising a lever block disposed between the supporting member and the first driving member, and a voussoir disposed between the supporting member and the lever block; the lever block having three force-bearing portions, the first force-bearing portion abutting against the supporting member, the second force-bearing portion abutting against the first driving member, and the third force-bearing portion abutting against the voussoir when engaging the brake, the second force-bearing portion being located between the first force-bearing portion and the third force-bearing portion; the voussoir abutting against the supporting member and being connected to the control mechanism, and being movable under the action of the control mechanism in the direction substantially perpendicular to the direction of the relative movement of the first and second driving members; the control mechanism being provided with a return spring for biasing the voussoir to its initial position when engaging the brake; the lever block being able to turn about the second force-bearing point as a lever fulcrum under the action of the voussoir to engage the brake or disengage the brake, wherein when engaging the brake, the application point of the force at the first force-bearing portion and that at the third force-bearing portion of the lever block being situated respectively on the opposite sides of the straight line which passes through the application point of the force at the second force-bearing portion of the lever block and extends along a direction parallel to the direction of the relative movement between the first driving member and the second driving member.

BRIEF DESCRIPTION OF THE ACCOMPANYING DRAWINGS

The embodiments of the invention will be described in detail in connection with accompanying drawings, in which FIG. 1 is a schematic view showing an embodiment of a disk-type brake used in motorcycles in accordance with the invention;

DETAILED DESCRIPTION OF THE PREFERRED EMBODIMENTS

An essential factor for friction brakes and friction clutches is to produce large normal pressure with small operating force and small operating stroke, and with a small operating stroke they can be made small in volume. The core of the present invention is to design a lever assembly that can produce very large force-boosting effect.

Figure 1:
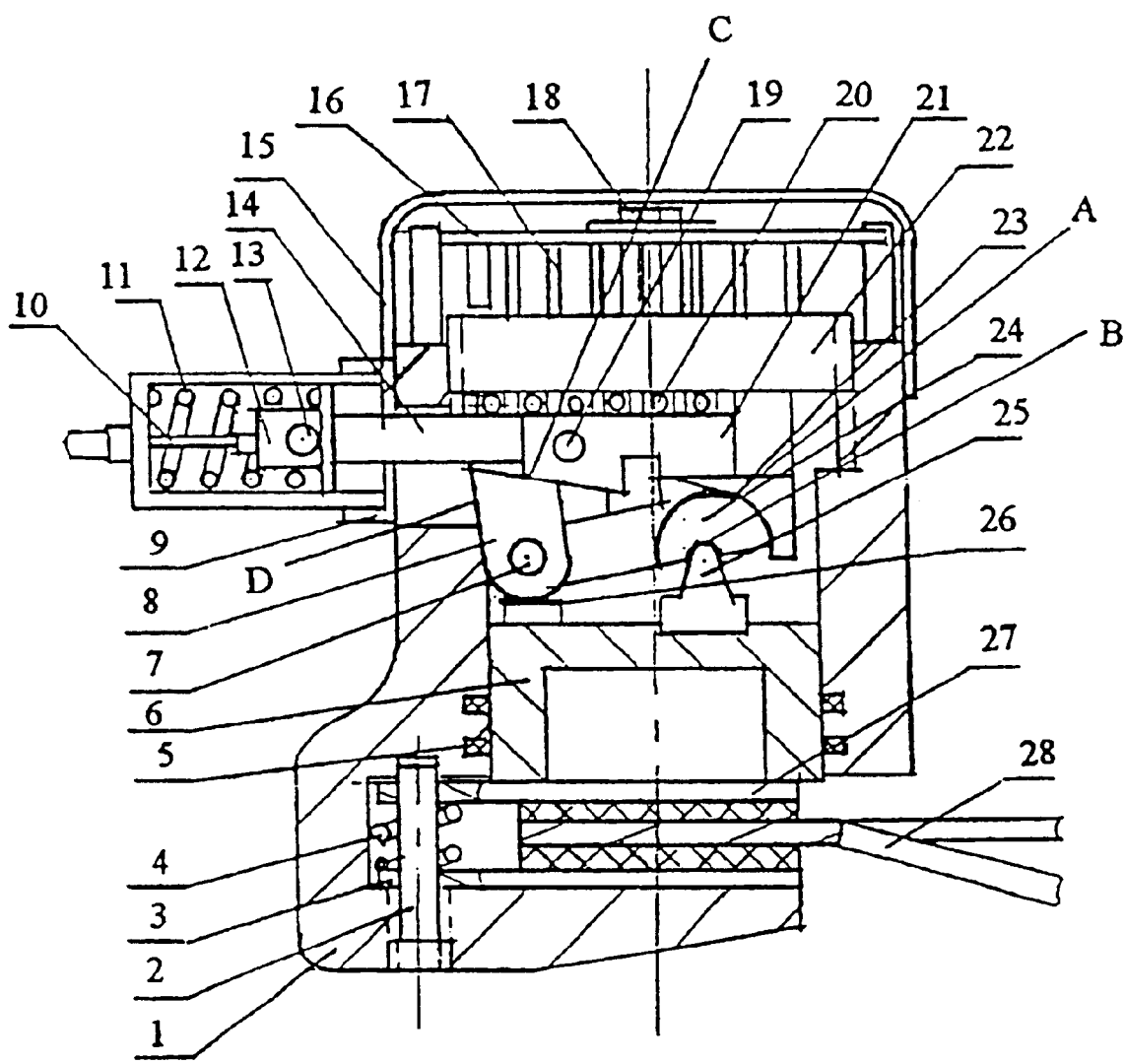
Figure 2:
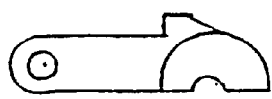
FIG. 2 and FIG. 3 are views showing a lever block used in the disk-type brake shown in FIG. 1.
Figure 3:
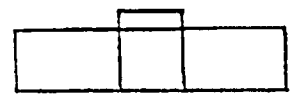
Figure 4:
FIG. 4 and FIG. 5 are views showing a force-transmission member used in the disk-type brake shown in FIG. 1.
Figure 5:
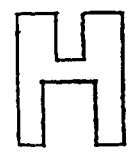
Figure 6:
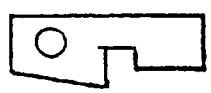
FIG. 6 and FIG. 7 are views showing a voussoir used in the disk-type brake shown FIG. 1.
Figure 7:

The preferred embodiments of the present invention will be described below in connection with FIGS. 1–21. FIG. 1 is a schematic view showing an preferred embodiment of the brake in accordance with the invention. As shown in FIG. 1, between a piston or pressing plate 6 and a supporting plate 22 there is disposed a lever block 24. The lever block 24 is preferably of a T shape, as shown in FIG. 2 and FIG. 3. When the desired service life is not very high, the portion B of the lever block 24 can directly abut against the piston or pressing plate 6, and in this case the portion B of the lever block 24 is preferably a convex curved surface or a raised facet; the portion A of the lever block 24 can also directly abut against the supporting plate 22, and in this case the portion A is preferably a convex curved surface or a raised facet, as shown in FIG. 20. A voussoir or wedge 21 abuts against the shank of the lever block 24 or abuts against a force-transmission member 8 at portion C, the configurations of the voussoir 21 and the force-transmission member 8 are shown in FIGS. 4~7. When applying the brake, the application point of the force on the curved surface A of the lever block 24 has a projection point on coordinate axis X, the application point of the force on curved surface B (lever fulcrum) is located at the origin of coordinates, and the application point of the force on curved surface C has a projective point on coordinate axis X, and this projection point has an sign opposite to that on X-axis of the application point of the force on curved surface A. With the three forces applied, the lever block 24 act as a force boosting or increasing lever.

Figure 10:
FIG. 10 to FIG. 12 are three views showing the right sliding block of the two sliding blocks used in the disk-type brake shown in FIG. 1.
Figure 11:
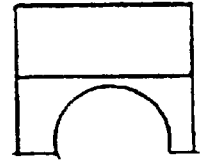
Figure 12:
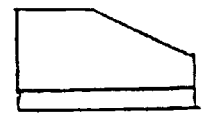

To improve the service life and reliability of the brake and clutch, between the lever block 24 and the supporting plate 22 there can be disposed a sliding block 23 with a configuration shown in FIGS. 10~12, thereby to greatly increase the contact area therebetween to improve their service life and reliability in large scale. The sliding block shown can be divided into two pieces. The portion A where the lever block 24 and the sliding block 23 contact with each other is a curved surface, and preferably the lever block 24 has a convex curved surface and the sliding block 23 has a concave curved surface, and preferably the two curved surfaces are corresponding arcuate surfaces with one containing the other. And of course, the curved surfaces can also be curved surfaces of other types with one containing the other, for example, one is a circular arc surface, and the other an elliptic arc surface.

Figure 8:
FIG. 8 and FIG. 9 are views showing an arcuate strip used in the disk-type brake shown in FIG. 1.
Figure 9:
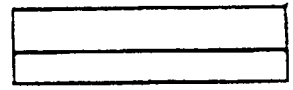

To facilitate manufacturing, stabilize the force boosting ratio and improve the service life, an arcuate strip 25 can be disposed between the lever block 24 and the piston or pressing plate 6, the configuration of the arcuate strip 25 is shown in FIGS. 8 and 9. The portion B where the lever block 24 and the arcuate strip 25 contact with each other is a curved surface, and preferably the portion B on the lever block 24 is a concave curved surface, the portion B on the arcuate strip 25 is a convex curved surface, and preferably the two curved surfaces are corresponding arcuate surfaces with one containing the other. On condition that particular technical requirements, especially the service life requirement, have been satisfied, it is desirable that the curved surface at the contact portion B be made small; because by doing so the boosting ratio will vary less after a period of use, like the pivot of a balance, and it is also easy for the lever block to turn.

Figure 19:
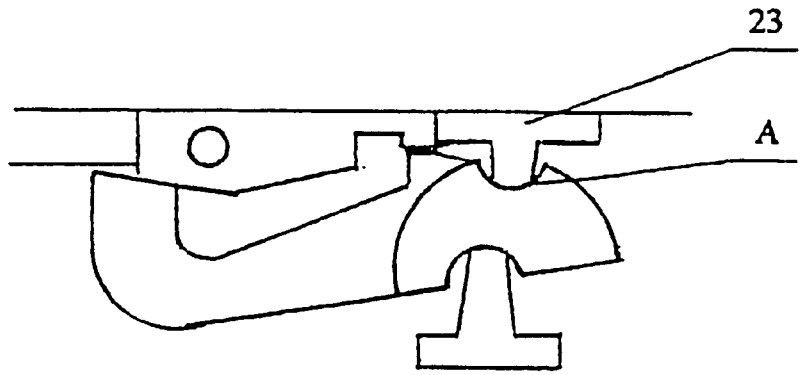
FIG. 19 is a schematic view showing the construction of another embodiment of the lever block assembly, wherein at portion A the lever block presents a concave arc and the sliding block a convex arc.
Figure 20:
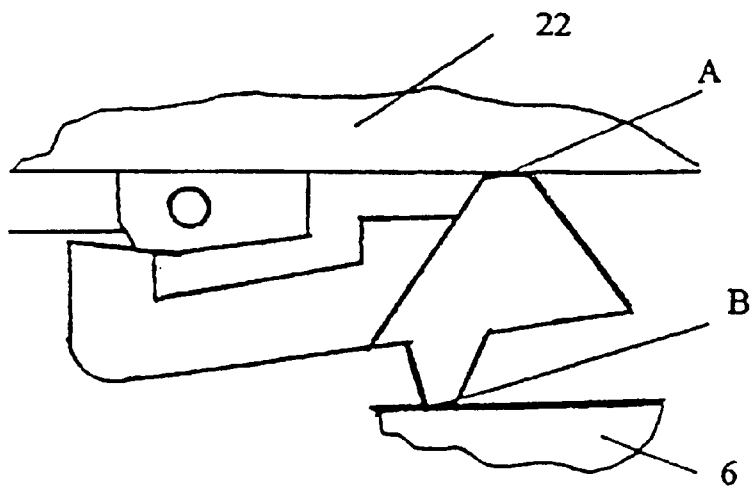
FIG. 20 is a schematic view showing the construction of another embodiment of the lever block assembly.

The portion C where the voussoir 21 and the shank of the lever block 24 contact with each other is a curved surface, and preferably both the voussoir and the shank of the lever block have an inclined flat surface at the contact region or one of them has an inclined flat surface to facilitate machining and to increase the contact area, and in addition, with inclined flat surface(s) the operating force can be further boosted, as shown in FIGS. 19–20. To stabilize and increase the contact area between the voussoir 21 and the lever block 24, a force-transmission member 8 can be disposed between them, as shown in FIG. 1. With the contact region being designed as inclined flat surfaces, the contact area can be greatly increased and accordingly the service life can also be improved. The portion D where the force transmission member 8 and the machine body 1 contact with each other can be curved surface, but is preferably a flat surface, and the D portion of the machine body or housing 1 is preferably a inclined flat surface, as shown in FIG. 1. With a inclined surface, the wear at the potion C can be compensated for.

Figure 16:
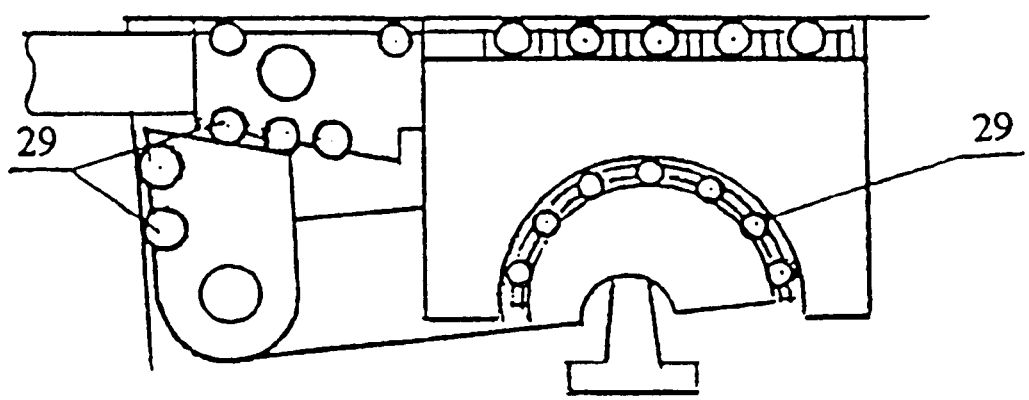
FIG. 16 is a schematic view showing the construction of another embodiment of the lever block assembly, wherein at the lever block, the sliding block, the voussoir and the force-transmission member there are provided with rolling elements.
Figure 17:
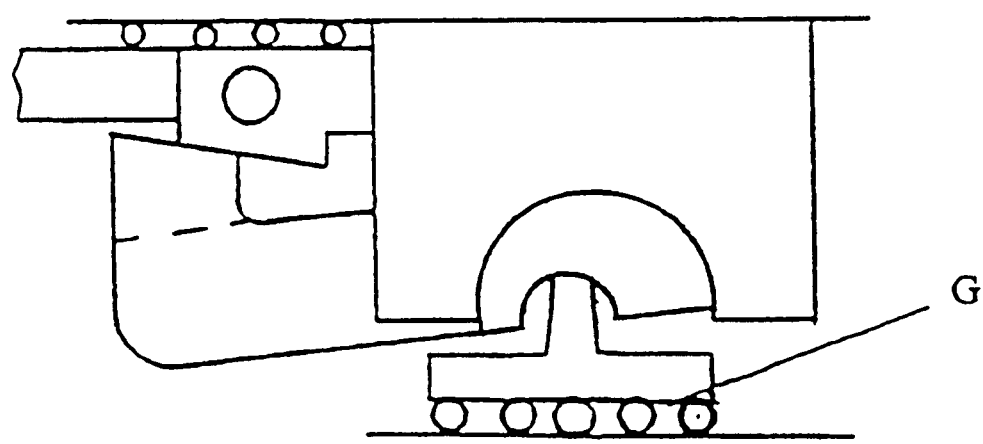
FIG. 17 is a schematic view showing the construction of yet another embodiment of the lever block assembly, wherein a shank of the lever block is integrally formed with the force-transmission member, between the arcuate strip and a piston or a pressing plate, and between the voussoir and the supporting member, there are provided with rolling elements.

To operate flexibly, conveniently and reliably, in the case that the portion A where the lever block 24 and the sliding block 23 contact with each other and the portion B where the lever block 24 and the arcuate strip 25 contact with each other are circular arc surfaces, rolling elements 29 can be disposed between them respectively. Rolling members 29 such as balls or roller pins can be disposed respectively between the sliding block 23 and the supporting plate 22, at the portion C where the voussoir 21 and the lever block 24 or the force transmission member 8 contact with each other, at the portion D where the force transmission member 8 and the machine body 1 contact with each other, and between the arcuate strip 25 and the piston or pressing plate 6, as shown in FIGS. 16 and 17. In the case that the rolling members 29 are disposed between the arcuate strip 25 and the pressing plate 6, the left and right displacement amount of the lever block 24 should be controlled in order for the brake or clutch to work well.

To facilitate the generation of clearance to favor the release of the brake or the disengagement of the clutch and eliminate the clearance quickly, a protrusion or a recess can be provided at the upper portion of the lever block 24, and a recess or a protrusion can be provided on the voussoir 21 accordingly, as shown in FIG. 1, such a arrangement is relatively simple in structure. As shown in FIG. 1, at the end of the shank of the lever block 24 there is disposed a small leaf spring 26 with a relatively big elastic constant and a relatively short stroke, this spring functions mainly to, at the early stage when the lever block 24 turns to generate a clearance, make the lever block turn by a small angle or help the restoring spring 11 turn the lever block 24.

Figure 14:
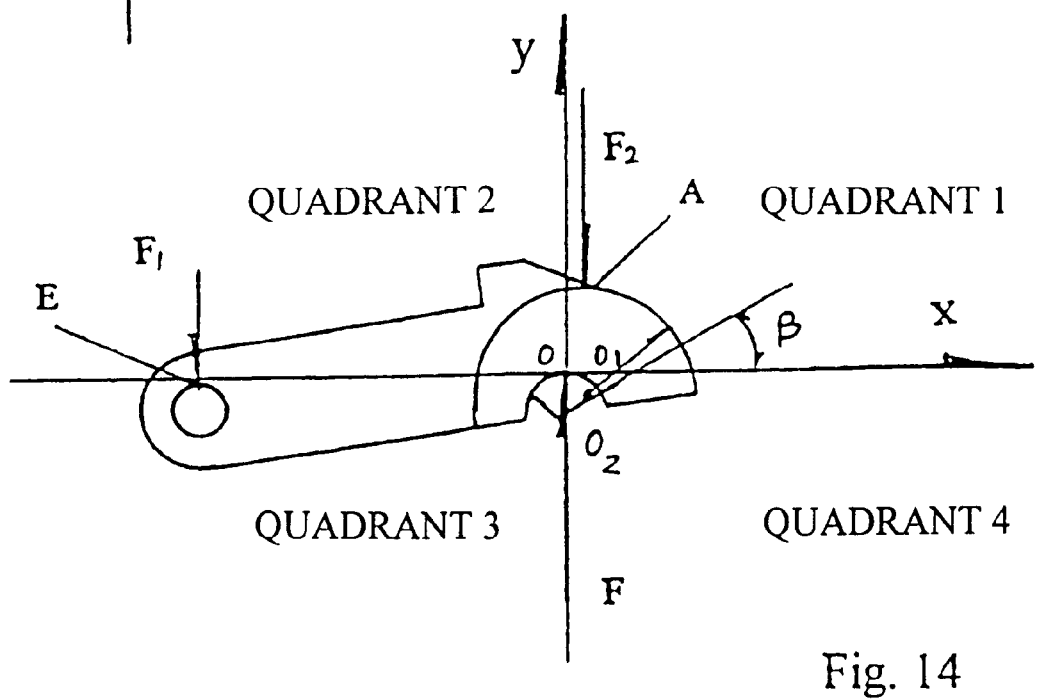
FIG. 14 is an illustration of the forces acting on the lever block.

The operation of the disk-type friction brakes will be described below in connection with FIG. 1. FIG. 1 shows a disk brake used in an motorcycle, its machine body 1 is connected to the motorcycle via pins, and it can move upwards after wear of the friction plates 3 and 27, but it can not rotate with wheels. A brake disk 28 is secured to the motorcycle wheel and rotates therewith. The connection with the motorcycle is the same as that of existing hydraulic disk-type brakes. FIG. 1 shows the braking condition. The release of the brake is as follows: when the leftward pulling force acting on the wire 10 is released, the pressure generated by the spring 11, transmitted via a guide shaft 12, a pin 13, a steel ribbon 14 and a pin 19, finally pushes the voussoir 21 to move rightwards. When the slant surface of the voussoir 21 is separated from the slant surface of the force-transmission 8, the left edge of the recess in the voussoir 21 pushes the protrusion on the lever block 24 and forces the lever block 24 to rotate clockwise. The projection of the connecting line between the center O1 of the arcuate surface A and the center O2 of the arcuate surface B on the lever block 24 on coordinate axis Y now becomes shorter, and the brake is released. The coordinate system is defined as such: the line is used as Y-axis which passes through the application point of the force on the accurate surface B of the lever block 24 and is perpendicular to the undersurface of the supporting plate 22, the application point of the force on the accurate surface B is the origin O of coordinates, and the line is used as X-axis which passes through the origin O and is perpendicular to Y-axis. When the projection of the connecting line between the center O1 of the accurate surface A of the lever block 24 and the center O2 of the arcuate surface B of the arcuate strip 25 on Y-axis becomes short, the piston 6 moves upwards under the action of the return rubber sealing rings 5 and the restoring spring 4, thus causing a clearance to be generated between the friction plates 3 and 27 and the brake disk 28 to release the brake. The protrusion on the lever block 24 now enters into the recess of the voussoir 21. When applying the brake, the operating force pulls the wire 10 to move leftwards, thereby causing the voussoir 21 to move leftwards; while the voussoir 21 moves leftwards, the right edge of the recess in the voussoir pushes the protrusion on the lever block 24, thus pushing the lever block 24 to rotate counterclockwise. When the lever block 24 rotates counterclockwise to a certain position, the recess is disengaged from the protrusion and the voussoir 21 presses the protrusion with its undersurface, and this constitutes the process of repaid elimination of the clearance. And at this moment, the inclined surface on the voussoir 21 has not yet contacted the inclined surface on the force transmission member 8, the normal pressure produced by the lever block 24 is not very large. The force transmission member 8 can swing by a certain extent about a pin 7 to make a better contact of the two inclined surfaces. When the voussoir 21 moves leftwards further to bring its inclined surface into contact with the inclined surface of the force transmission member 8, the force transmission member 8 moves downwards and transmits downwards the operating force, which has been multiplied by the inclined surface, via the pin 7 to the shank E of the lever block 24. Now, the clearance between the friction plates 3 and 27 and the brake disk 28 has been eliminated completely, and this constitutes the process of braking. When a maximum braking force is produced, the projection of the connecting line between the center O1 of the arcuate surface A on the lever block 24 and the center O2 of the arcuate surface B on the arcuate strip 25 on Y-axis maximizes (as shown in FIG. 14), and the application point of the force on the arcuate surface A has a projection on X-axis which is not equal to zero. The application point of the force on the shank E of the lever block 24 is on one side of Y-axis, while the application point of the force on the arcuate surface A is on the other side of Y-axis, i.e. their projections on X-axis have opposite signs. Now, the clamping forces acting on the brake disk are transmitted via two paths, one path is: the force at the arcuate surface A of the lever block 24 is transmitted to the supporting plate 22 via the sliding block 22, then the supporting plate 22 transmits the force through its crew threads to the machine body 1, then the force is transmitted by the machine body 1 to the friction plate 3, and finally the force acts on the brake disk 28. The other path is: the force at the arcuate surface B on the lever block 24 is transmitted via the arcuate strip 25 to the piston 6, then the force is transmitted by the piston 6 to the friction plate 27, and finally the force acts on the brake disk 28. As a result, the brake disk 28 is clamped between the friction plates 3 and 27, and thus the motorcycle is braked. The operation principle can also be used to automobiles and the like, with possible variations in sizes and configurations of the brakes. To make it work more flexibly and smoothly and to prevent self-lock, rolling elements can be disposed between the force-bearing surfaces, as shown in FIGS. 16 and 17.

Figure 18:
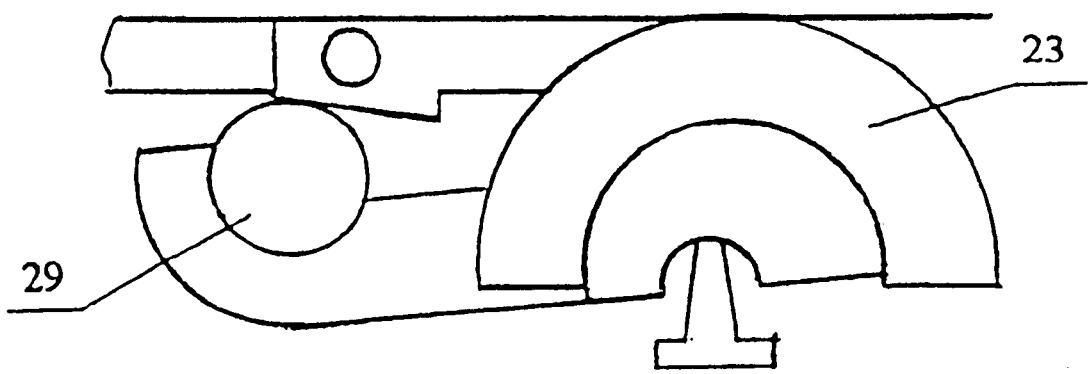
FIG. 18 is a schematic view showing the construction of another embodiment of the lever block assembly, wherein the sliding stock is a semicircular one and the shank of the lever block is provided with a rolling element.

In the case that the technical requirements are not too strict, the sliding block 23 can be omitted, and the curved surface can be a circular arc surface, even a fact, as shown in FIG. 20. And a rolling element 29 can be disposed between the two inclined surfaces, as shown in FIG. 18.

In the case that the technical requirements such as service life and reliability are not strict, a big protuberance or boss can be formed directly at the shank E of the lever block 24 to match with the inclined surface on the voussoir 21, thereby two members can be omitted, but in this case it tends to present line contact, as show in FIGS. 17, 19, 20 and 21. Further, the sliding block 23 can also be in the form of a semicircular ring, but this will somewhat affect the service life, as shown in FIG. 18.

Compared with the conventional mechanical and hydraulically actuated disk brakes, the inventive mechanical disk brake can produce a normal pressure many times larger under the same operating force and operation stroke without a booster, the principle will be described below.

When to produce the normal pressure by means of the lever block 24, there exist two mechanisms by which the force is boosted or multiplied at the same time, one is the inclined surface at the portion C, and the other is the lever with three forces applied respectively at the shank C, portion B and portion A, thus achieving a great force-boosting effect.

Assume that the force boosting ratio of the lever block 24 is I, the boosting ratio of the inclined surface is $I_1$, and the boosting ratio of the lever (C, B, A) is $I_2$, then $$I = I_1 \times I_2$$

where $$I_1 = 1/\text{tg}\alpha$$

Figure 13:
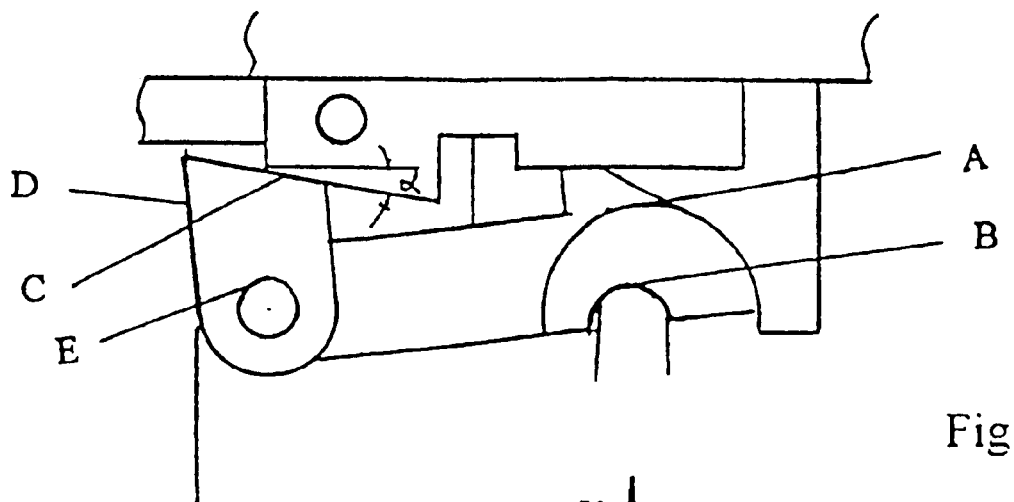
FIG. 13 is a schematic view showing the force-bearing potions of the lever block.

$\text{tg}\alpha$ is the friction coefficient, and $\alpha$ is the inclination of the inclined surface, as shown in FIG. 13. For common metallic materials, the value of friction coefficient is generally in the range of 0.10~0.05 under the condition that there is no lubrication and the surface is finished; or in the range of 0.05~0.01 if there are rolling elements between the surfaces.

Therefore, it is ready for $I_1$ to have a value of 10, and the magnitude of $I_1$ can be changed in accordance with particular design requirements.

Figure 15:
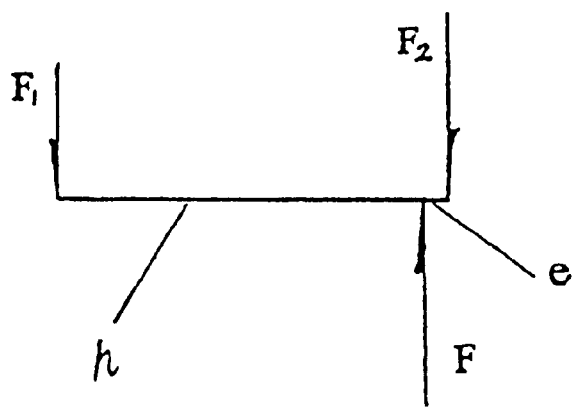
FIG. 15 is an illustration for the calculation of the normal pressure F.

And $I_2 = h/e$, as shown in FIG. 15, it can be determined by the operation stroke and the desired clearance, and can have a value of more than 10.

Therefore the force can be multiplied or increased by more than 100 times or even higher, for example, 400 times, however the operation stroke is not large, this is why it is superior to other boosters. Generally, the conventional devices have only one mechanism for boosting or increasing the force with regard to one member, while the lever block 24 of the invention has two mechanism to boost or increase the force (when calculating the boosting ratio, the force transmission member 8 and the pin 7 are considered as the big protuberance).

When designing the brake, under the precondition that various technical requirements have been satisfied, it should be taken into consideration that the circular arc surface where the arcuate strip 25 and the curved surface B of the lever block 24 press against each other should be as small as possible to ensure enough boosting ratio and stabilize the boosting ratio, act as the pivot or fulcrum of a balance. The contact area where the lever block 24 and the sliding block 23 engage each other should be relatively large, because the sliding block 23 has a small displacement when the lever block 24 turns, and a larger containing surface can facilitate the displacement.

To reduce the operation stroke and increase the clearance, the angle β between the connecting line between the center O1 of the arcuate surface A and the center O2 of the arcuate surface B on the lever block 24 and X-axis can be designed to be in the range where the sin β varies rapidly. When the lever block 24 turns during release of the brake, an clearance big enough can be generated and the amount of displacement of the sliding block 23 can be reduced (as shown in FIG. 14).

To reduce the operation stroke, instead of forming a recess on the voussoir 21, a large slant or inclined surface can be provided on the voussoir 21 at the region where the voussoir presses against the force transmission member 8 (of course, it is also possible to additionally provide a large slant surface on the force-transmitting member 8), and the right end of the voussoir 21 is used to push the small protrusion of the lever block 24 directly to make it turn, as shown in FIG. 20.

Figure 21:
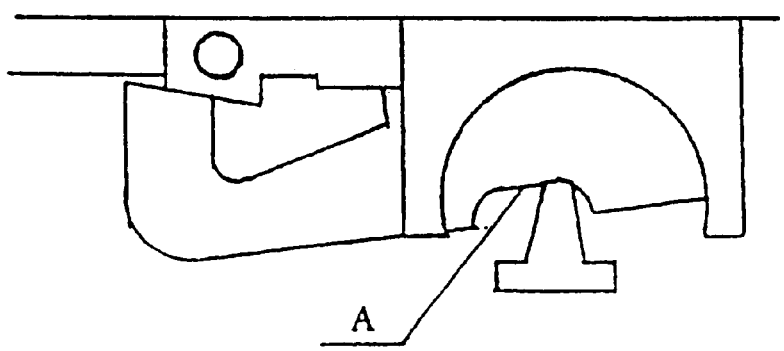
FIG. 21 is a schematic view showing the construction of another embodiment of the lever block assembly, wherein at portion B of the lever block the arc is widened to facilitate the quick elimination of the clearance and the quick enlargement of the clearance.

To reduce the operation stroke, an curved surface, which enables the lever block 24 to move leftwards and rightwards when releasing the brake, can be additionally formed associated with the arcuate surface B, thus being able to rapidly eliminating the clearance when releasing the brake, as shown in FIG. 21.

Figure 22:
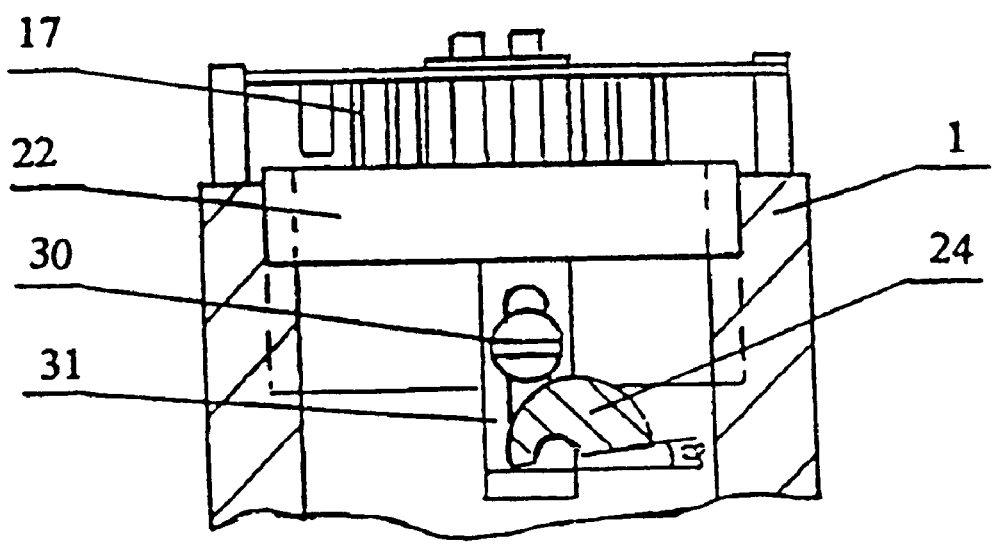
FIG. 22 and FIG. 23 is a schematic view showing an automatic compensation device used in the disk-type brake shown in FIG. 1.
Figure 23:
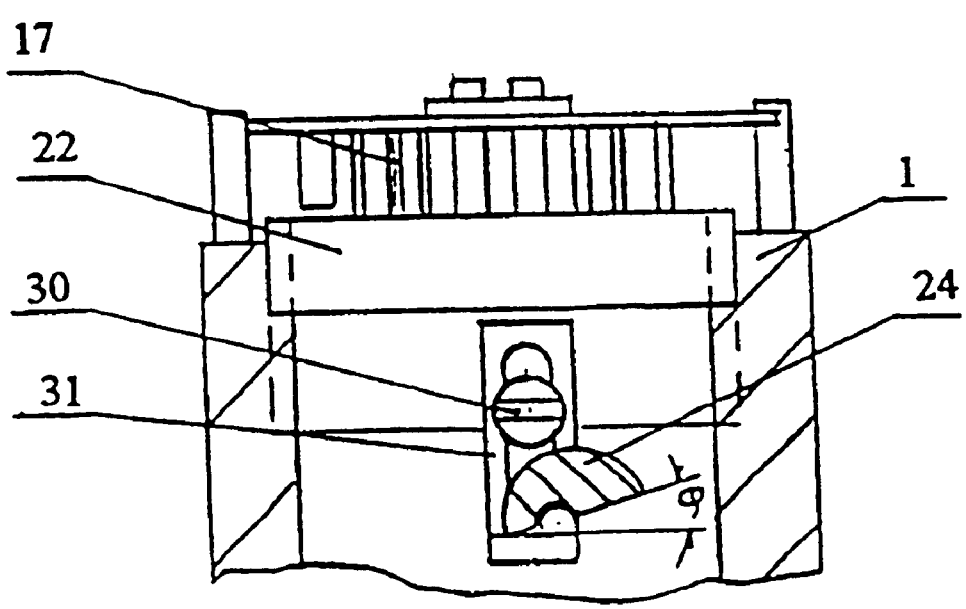

Such a disk brake and clutch, due to the small wear amount available which is generally about 0.2 mm, is preferably provided with an automatic compensation means. FIGS. 22 and 23 are schematic views showing an automatic compensation means, FIG. 22 shows the uncompensated state, since the wear amount of the friction plate for each emergency braking is less than 0.05 mm, sometimes the means does not make compensation. The operation principle is as follows: when the friction plates 3 and 27 wears down, the rotating angle φ of the lever block 24 increases, and the side of the lever block towards the shank presses on a positioning piece 31 and moves the positioning piece 31 downwards. The positioning piece 31 is fitted against the machine body 1 not too tightly, if only the friction force produced by it can prevent the supporting plate 22 from rotating and therefore moving downward under the action of a coil spring 17. After the positioning piece 31 moves downwards, a slight clearance is created between the positioning piece 31 and the supporting plate 22, as shown in FIG. 23, and at this time the compensation can not be carried out. When releasing the brake, the coil spring 17 drives the supporting plate 22 to rotate and moves the supporting plate 22 downwards (there are screw threads formed on the periphery of supporting 22), and the supporting plate 22 stops moving downward upon contacting the positioning piece 31, thus completing an automatic compensation. The amount of compensation can be set according to particular requirements, and this type of compensation means has its use in conventional drum and disk brakes. In order that the voussoir 21 and the force transmission member 8 as well as the pin 7 can also be compensated after wearing down without enlarging the operation stroke, a inclined flat surface is formed on the machine body 1 which contacts the force transmission member 8. That is, when the force transmission member 8 moves downwards, the force transmission member 8 can be caused by the surface to swivel slightly clockwise, thus achieving the purpose of compensation. To facilitate the generation of a clearance, a spring with a small stroke and a large elastic constant can be disposed at the end of the shank of the lever block 24, such as the leaf spring 26 in FIG. 1. Thus, the spring will make the lever block 24 rotate slightly clockwise after the slant surface of the voussoir 21 is disengaged from the slant surface of the force transmission member 8, or exerts a force on the lever block 24 to turn it clockwise, thereby causing the voussoir 21 to easily push the lever block 24 to turn.

Compared with the conventional motorcycle brakes, the motorcycle disk brakes with boosting mechanism of the invention have the following advantages:
1. With the same operating force and operation stroke, the braking force is increased by a couple of times to more than ten times;
2. To obtain the same braking force, the operating force is decreased by a couple of times to more than ten times;
3. Since they do not use a hydraulic system and have a simple configuration, they have a high reliability;
4. Since their accuracy can be relatively low and are have a simple configuration, their production cost are reduced;
5. They do not have the problems of heat fading and water fading associated with drum brakes, so they are of higher safety.

Compared with the conventional hydraulic disk and drum brakes, the disk brakes, when used in automobiles, have the following advantages:
1. Since they can generate a larger braking force, they can be used in large automobiles;
2. They do not have the drawbacks of heat fading and water fading associated with drum brakes;
3. Since they do not use a hydraulic system, the leakage problem can be avoided, and they have much higher reliability, and the cost is much lower;
4. There is no need for boosting devices, such as a vacuum pump, an air-compressor and the like, thus braking can be carried out normally when they engine does not operate to have the safety enhanced very much.

An embodiment of an automobile clutch of the present invention will be described below in connection with FIG. 24. A flywheel 1 is fixedly connected to the crankshaft of an engine, the power is transmitted to a driven disk 28 via two paths. One path is: the torque is transmitted frictionally from the fly wheel 1 to the driven disk 28; the other path is: the torque is transmitted from the flywheel to a pressing disk 6 (the piston 6 in a brake) via bolts, the housing 36, pins, a steel plate 41 and other bolts, the pressing disk 6 are pressed tightly on the driven disk 28 under the action of several sets of lever block 24, thereby achieving torque transmission by friction. The driven disk 28 transmits the torque received from the two paths to a driven shaft so as to drive the automobile.

Figure 24:
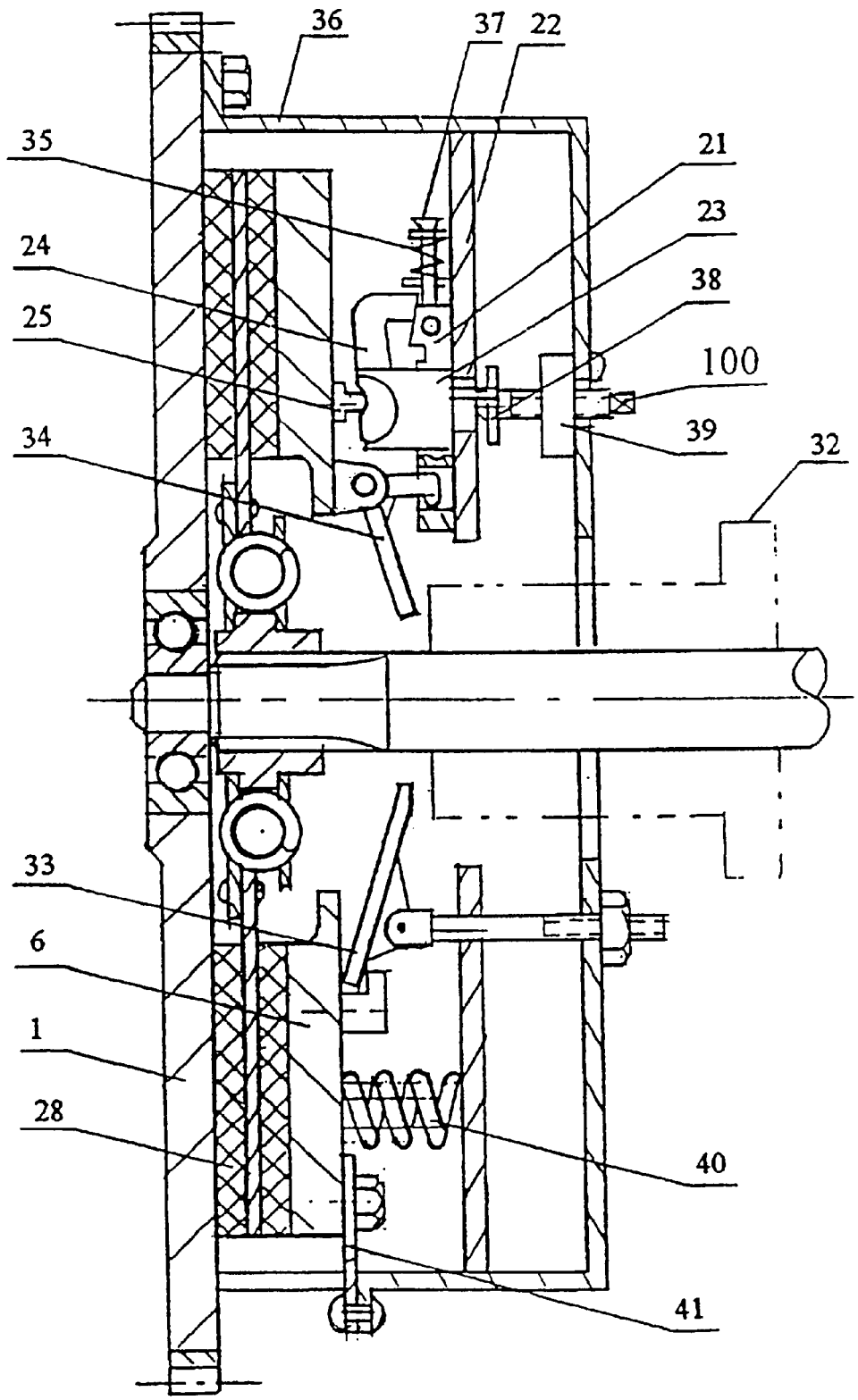
FIG. 24 is a sectional view of an automobile friction clutch of an embodiment in accordance with the invention.

In FIG. 24, reference numeral 39 designates a nut and 100 designates a screw with a ratchet. One of their functions is to stabilize the clearance between the pressing disk 6 and the supporting plate 22, and the other is to conduct a automatic stepwise compensation. On the voussoir 21 there is provided a pawl, when the operation stroke of the voussoir 21 increases due to the wear of relevant members, the pawl on the voussoir 21 catches a tooth on the ratchet 38, and rotates the ratchet 38 when the voussoir 21 moves along with the disengagement of the clutch, thereby push the supporting plate 22 to move leftwards slightly through the screw 100, thus achieving the purpose of automatic compensation. In the clutch there are disposed a plurality of sets of lever block assembly and compensation devices so as to produce uniform pressure.

Figure 25:
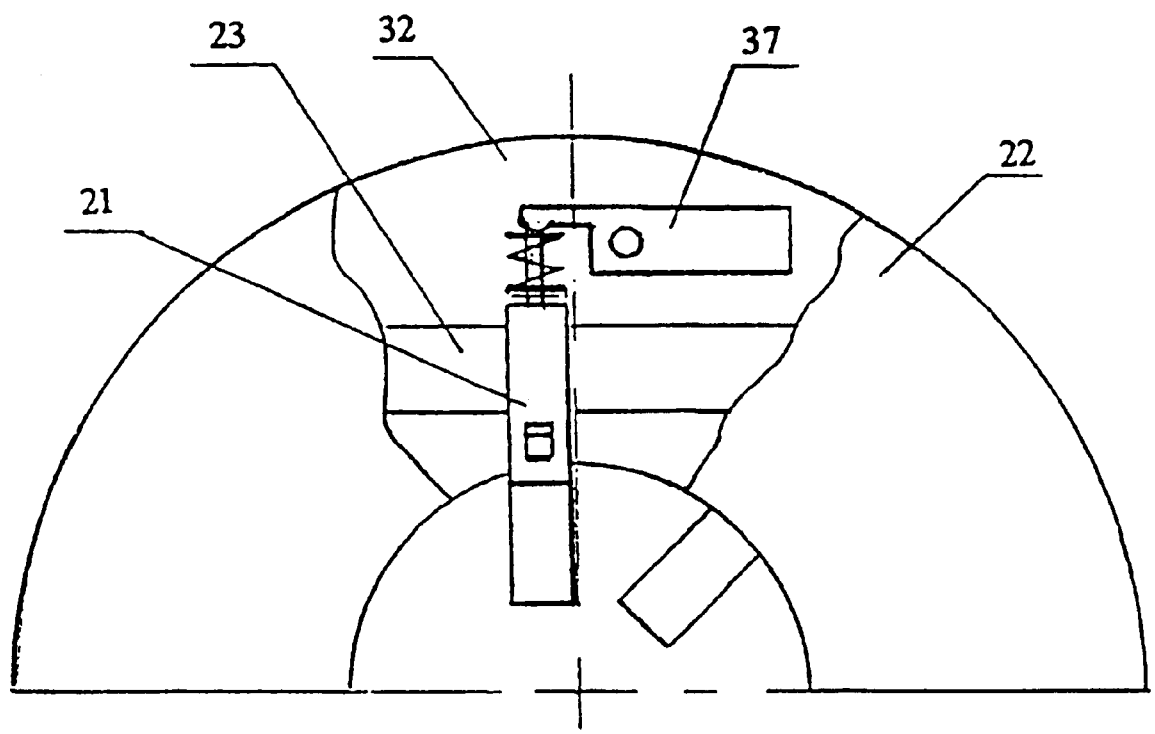
FIG. 25 is a partial view of the friction clutch shown in FIG. 24, as seen in the axial direction.

When there is a need for disengagement of the clutch, a actuating member 32 (shown by dash-and-dot lines in the figure) moves leftwards under the action of an external force and presses on a voussoir fork 34 to rotate it clockwise. The fork drives the voussoir 21 to move inwards, causing the lever block 24 to turn, and therefore the normal pressure is decreased and eliminated finally. If the clutch is not provided with clearance generating pawls 33 (when conditions permit, it is also possible to combine the fork 34 and the pawl 33 into one member which has the functions of both the fork and the pawl), maybe the driven disk 28 can not be separated completely from the fly wheel 1 and the pressing disk 6, and this will affect the operation performance. To overcome this drawback, the clearance generating pawls 33 operate as such: after the actuating member 32 rotates the fork 34 and causes the lever block 24 to start turning, the actuating member 32 starts to push the pawls 33 (a plurality of pawls can be uniformly arranged) to rotate it counter-clockwise while continuing to push the fork 34 to rotate clockwise. The pawls 33 pushes the pressing disk 6 rightwards, therefore the pressing disk 6 move rightwards and compresses the spring 40, causing the steel plate 41 bend slightly, and now a larger clearance is generated between the fly wheel 1, the pressing disk 6 and the driven disk 28, so that they are separated completely. During engagement of the clutch, the actuating member 32 moves rightwards, and the pressing disk 6 is pushed leftwards under the action of the spring 40. When the pressing disk 6 returns to its original position, the voussoir 21 turns the lever block(s) 24 under the action of the spring 35 and presses it (them) against the pressing disk 6, and as a result, the clutch is brought into engagement. In the engaging state, the torque transmitted by the clutch can be controlled by controlling the magnitude of elastic force of the spring 35, and the engaging speed of the clutch can be controlled by controlling the moving speed of the actuating member 32. Thus various needs of various vehicles can be met. In the case shown in the figure, the torque which can be transmitted by the clutch will increase when the centrifugal forces increase, and this may result in harmful effects, therefore it is desirable to eliminate the effects of centrifugal forces on the torque transmitted. To this end, the clutch is provided with a counterbalance 37, as shown in FIG. 25. With the counterbalance, the centrifugal forces produced by such clement as the voussoir 21 can be counteracted. Thus, when the rotational speed increases, the torque transmitted does not increase. Alternatively, to eliminate the effects of centrifugal forces, the arrangement of the voussoir 21 can be so modified that the voussoir 21 moves in a direction perpendicular to that shown in FIGS. 24 and 25, but with this arrangement, the mechanism used to control the movement of the voussoir 21 will be more complicated.

The clutch of the invention can produce a big normal pressure with a small operating force by using only the operating springs 35 and 40 with a relatively small elastic force. Compared with the conventional spring clutches and diaphragm clutches, the clutches of the invention has the following advantages.

1. the stroke is shortened by more than 40% compared with that of above two conventional clutches without reducing the torque transmitted.
2. In the case of transmitting the same torque, the operating force is many times smaller, or with the same operating force, the torque transmitted is a couple of times or more than ten times larger.
3. It is quite easy for it to be constricted as a wet clutch without the need for boosters, and its service life is 4~8 times longer than that of a dry-type clutch and even comparative to that of an automobile.
4. Since its normal pressure can be very large, the driven disk does not need to be lined with polluting asbestos and costly sintered alloys as friction materials, thus a steel plate can be used as the driven disk.
5. It's cost may be about 30% higher than that of above two conventional clutches, but its cost performance is many times higher than that of the two conventional clutches.
6. Since it can use a steel plates as friction members, the service life is greatly improved, the maintenance is quite convenient, and the overhaul period is many times longer.

The present invention has been described in connection with embodiments, but the persons skilled in the art will appreciate that the foregoing description is by way of example only, and is not intended to be limitative of the invention so further described in such appended claims.

What is claimed is:

1. A mechanical disk-type friction brake, comprising a control mechanism for controlling the operation of the brake; a first driving member and a second driving member, the first and second members being able to move relative to each other; a driven member disposed between said first and second driving members and being able to engage frictionally with said driving members; and a supporting member connected with said second driving member, said supporting member being on the side of the first driving member opposite to said driven member, wherein said brake further comprising a lever block disposed between said supporting member and said first driving member, and a voussoir disposed between the supporting member and the lever block; said lever block having three force-bearding portions, the first force-bearing portion abutting against said supporting member, the second force-bearing portion abutting against said first driving member, and the third force-bearing portion abutting against said voussoir when applying the brake, said second force-bearing portion being located between the first force-bearing portion and the third force-bearing portion; said voussoir abutting against said supporting member and being connected to said control mechanism, and being movable under the action of the control mechanism in the direction substantially perpendicular to the direction of the relative movement of the first and second driving members; said control mechanism being provided with a return spring for biasing said voussoir to its initial position when releasing the brake; said lever block being able to turn about the second force-bearing point as a lever fulcrum under the action of the voussoir to apply the brake or release the brake, wherein when applying the brake, the application point of the force at the first force-bearing portion and that at the third force-bearing portion of the lever block being situated respectively on the opposite sides of the straight line which passes through the application point of the force at the second force-bearing portion of the lever block and extends along a direction parallel to the direction of the relative movement between the first driving member and the second driving member.

2. The brake according to claim 1, wherein said brake further comprises spring means for urging the first and second driving members to separate from said driven member when releasing the brake, said first and second force-bearing portions and are curved surfaces and said third force-bearing point is a slant flat surface or curved surface, and the portion of said voussoir which abuts against said slant flat surface or curved surface is a slant flat surface or curved surface.

3. The brake according to claim 1, wherein at the position of the first force-bearing portion, between the lever block and the supporting member there is disposed a sliding block, the first force-bearing portion of the lever block is a convex curved surface, the portion of the sliding block which abuts against the first force-bearing point, between the lever block and the first driving member there is disposed an arcuate strip, the second force-bearing portion of the lever block is a concave curved surface, and the portion of the arcuate strip which abuts against the second force-bearing portion is a convex curved surface; and the third force-bearing portion of the lever block is a slant flat surface or curved surface, and the portion of said voussoir which abuts against said slant flat surface or curved surface is a slant flat surface or curved surface.

4. The brake according to claim 3, wherein on the third force-bearing portion side of the lever block, there is disposed a force-transmission member which is hinged via a pin to the lever block, the force transmission member abuts against said voussoir when applying the brake, the portion of the member abutting against said voussoir constitutes said third force-bearing portion of the lever block; one side of the force-transmission member which is opposite to the second force-bearing portion abuts against the second driving member.

5. The brake according to claim 4, wherein rolling elements are disposed between the mutually contacting portions of the lever block and the sliding block, between the mutually contacting portions of the lever block and the arcuate strip, between the sliding block and the supporting plate, between the voussoir and the supporting plate, between the mutually contacting portions of the voussoir and the lever block or the force-transmission member, between the mutually contacting portions of the force-transmission member and the second driving member; and between the arcuate strip and the first driving member.

6. The brake according to claim 5, wherein at the portion where the force-transmission abuts against the second driving member, the force-transmission member presents a flat surface, while the second driving member presents an inclined flat surface.

7. The brake according to claim 1, wherein on the lever block there is provided a protrusion or recess, while on the voussoir there is provided a corresponding recess or protrusion, said protrusion and recess are used to turn the lever block at the early stage of applying the brake or at the later stage or releasing the brake.

8. The brake according to claim 1, wherein said brake further comprises an automatic compensation means for carrying out an automatic compensation to the clearance resulting from the wear of friction plates.

9. The brake according to claim 1, wherein on the side of the third force-bearing portion of the lever block, between the lever block and the first driving member there is disposed a compression spring.

10. A mechanical disk-type friction clutch, comprising a control mechanism for controlling the operation of the clutch; a first driving member and a second driving member, the first and second members being able to move relative to each other; a driven member disposed between said first and second driving members and being able to engage frictionally with said driving members; and a supporting member connected with said second driving member, said supporting member being on the side of the first driving member opposite to said driven member, wherein said clutch further comprising a lever block disposed between said supporting member and said first driving member, and a voussoir disposed between the supporting member and the lever block; said lever block having three force-bearing portions, the first force-bearing portion abutting against said supporting member, the second force-bearing portion abutting against said first driving member, and the third force-bearing portion abutting against said voussoir when engaging the brake, said second force-bearing portion being located between the first force-bearing portion and the third force-bearing portion; said voussoir abutting against said supporting member and being connected to said control mechanism, and being movable under the action of the control mechanism in the direction substantially perpendicular to the direction of the relative movement of the first and second driving members; said control mechanism being provided with a return spring for biasing said voussoir to its initial position when engaging the brake; said lever block being able to turn about the second force-bearing point as a lever fulcrum under the action of the voussoir to engage the brake or disengage the brake, wherein when engaging the brake, the application point of the force at the first force-bearing portion and that at the third force-bearing portion of the lever block being situated respectively on the opposite sides of the straight line which passes through the application point of the force at the second force-bearing portion of the lever block and extends along a direction parallel to the direction of the relative movement between the first driving member and the second driving member.

11. The clutch according to claim 10, wherein said clutch further comprises spring means disposed between the supporting member and the first driving member and used for urging the first and second driving members to engage with said driven member when engaging the clutch.

12. The clutch according to claim 11, wherein said the first and second force-bearing portions are curved surfaces, the third force-bearing point is a slant flat surface or curved surface, and the portion of said voussoir which abuts against said slant flat surface or curved surface is a slant flat surface or curved surface.

13. The clutch according to claim 11, wherein at the position of the first force-bearing portion, between the lever block and the supporting member there is disposed a sliding block, the first force-bearing portion of the lever block is a convex curved surface, the portion of the sliding block which abuts against the first force-bearing portion is a concave curved surface; and at the position of the second force-bearing point, between the lever block and the first driving member there is disposed an arcuate strip, the second force-bearing portion of the lever block is a concave curved surface, and the portion of the arcuate strip which abuts against the second force-bearing portion is a convex curved surface; and the third force-bearing portion of the lever block is a slant flat surface or curved surface, and the portion of said voussoir which abuts against said slant flat surface or curved surface is a slant flat surface or curved surface.

14. The clutch according to claim 13, wherein rolling elements are disposed between the mutually contacting portions of the lever block and the sliding block, between the mutually contacting portions of the lever block and the arcuate strip, between the sliding block and the supporting plate, between the voussoir and the supporting plate, between the mutually contacting portions of the voussoir and the lever block, and between the arcuate strip and the first driving member.

15. The clutch according to claim 10, wherein on the lever block there is provided a protrusion or recess, while on the voussoir there is provided a corresponding recess or protrusion, said protrusion and recess are used to turn the lever block at the early stage of engaging the clutch or at the later stage of disengaging the clutch.

16. The clutch according to claim 10, wherein said clutch further comprises an automatic compensation means for carrying out an automatic compensation to the clearance resulting from the wear of friction plates.

17. The clutching according to claim 10, wherein on the side of the third force-bearing portion of the lever block, between the lever block and the first driving member there is disposed a compression spring.

* * * * *